(12) United States Patent
Lee

(10) Patent No.: US 7,682,735 B2
(45) Date of Patent: Mar. 23, 2010

(54) POUCH TYPE LITHIUM SECONDARY BATTERY AND METHOD OF FABRICATING THE SAME

(75) Inventor: Hyung Bok Lee, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 628 days.

(21) Appl. No.: 11/362,559

(22) Filed: Feb. 23, 2006

(65) Prior Publication Data

US 2006/0216591 A1    Sep. 28, 2006

(30) Foreign Application Priority Data

| Mar. 28, 2005 | (KR) | ................. 10-2005-0025541 |
| Mar. 28, 2005 | (KR) | ................. 10-2005-0025544 |
| Mar. 28, 2005 | (KR) | ................. 10-2005-0025545 |

(51) Int. Cl.
H01M 2/04    (2006.01)
H01M 2/02    (2006.01)
H01M 2/08    (2006.01)
H01M 4/82    (2006.01)

(52) U.S. Cl. .............. 429/176; 429/177; 429/162; 429/185; 29/623.1; 29/623.2; 29/623.4

(58) Field of Classification Search ............. 429/53–55, 429/127–129, 131, 133, 135–136, 138–139, 429/142, 162–163, 175–178, 180–182, 184, 429/185–186; 29/623.1–623.5; 428/500, 428/515–523
See application file for complete search history.

(56) References Cited

U.S. PATENT DOCUMENTS 5,916,704 A  *  6/1999  Lewin et al. ............ 429/54
6,048,638 A  *  4/2000  Pendalwar ............ 429/127
6,468,690 B1 * 10/2002  Barker et al. ............ 429/162
6,676,714 B2    1/2004  Langan
6,902,844 B2    6/2005  Yageta et al.

(Continued)

FOREIGN PATENT DOCUMENTS

EP    1 1 07 336 A2    6/2001

(Continued)

OTHER PUBLICATIONS

Korean Patent Abstracts, Publication No. 1020040027365 A, dated Apr. 1, 2004, in the name of Hiratsuka Masaru et al.

(Continued)

*Primary Examiner*—Dah-Wei D Yuan
*Assistant Examiner*—Claire L Rademaker
(74) *Attorney, Agent, or Firm*—Christie, Parker & Hale, LLP

(57) ABSTRACT

A pouch type lithium secondary battery includes an electrode assembly including a first electrode plate connected to a first electrode tap, a second electrode plate connected to a second electrode tap, and a separator interposed between the first and second electrode plates. The battery also includes a pouch exterior having an electrode assembly storing portion and at least a wing portion extending from at least an end of the electrode assembly storing portion, the wing portion entirely winding around side faces of the electrode assembly storing portion. A method of fabricating a pouch type lithium secondary battery is also disclosed.

18 Claims, 20 Drawing Sheets

U.S. PATENT DOCUMENTS

| | | | |
|---|---|---|---|
| 7,166,389 | B2 | 1/2007 | Hiratsuka et al. |
| 2002/0022180 | A1* | 2/2002 | Olsen et al. ................ 429/176 |
| 2004/0029001 | A1* | 2/2004 | Yamazaki et al. ........... 429/176 |
| 2004/0115527 | A1* | 6/2004 | Hiratsuka et al. ........... 429/176 |
| 2005/0151514 | A1 | 7/2005 | Kozu et al. |

FOREIGN PATENT DOCUMENTS

| | | |
|---|---|---|
| KR | 10-2003-0067517 | 8/2003 |
| KR | 10-2003-0096718 | 12/2003 |
| KR | 10-2004-0027365 | 4/2004 |
| WO | WO 03/081695 | 10/2003 |

OTHER PUBLICATIONS

U.S. Office action dated Dec. 30, 2008, for related U.S. Appl. No. 11/540,855, indicating relevance of listed reference in this IDS.

U.S. Office action dated Jun. 19, 2009, for related U.S. Appl. No. 11/540,855, noting listed "Dictionary" reference in this IDS.

Dictionary.com, LLC; http://dictionary.reference.com/browse/around; (2009), 5 pages.

* cited by examiner

POUCH TYPE LITHIUM SECONDARY BATTERY AND METHOD OF FABRICATING THE SAME

CROSS-REFERENCE TO RELATED APPLICATIONS

This application claims the priority of Korean Patent Application Nos. 10-2005-0025541 filed on Mar. 28, 2005, 10-2005-0025544, filed on Mar. 28, 2005, and 10-2005-0025545, filed on Mar. 28, 2005 in the Korean Intellectual Property Office, the entire contents of which are incorporated herein by reference.

BACKGROUND OF THE INVENTION

1. Field of the Invention

The present invention relates to a lithium secondary battery and a method of fabricating the same, and more particularly, to a pouch type lithium secondary battery and a method of fabricating the same having a simplified packaging process.

2. Description of Related Art

Typically, in a lithium secondary battery, a lithium based oxide is used as a positive active material, and a carbon based material is used as a negative active material. The lithium secondary battery can be classified into a liquid electrolyte battery and a polymer electrolyte battery depending on a type of the electrolyte. The liquid electrolyte battery is often referred to as a lithium ion battery, and the polymer electrolyte battery is often referred to as a lithium polymer battery. In addition, the lithium ion battery is fabricated in various shapes such as a roll type, a polygonal type, and a pouch type.

Among them, the pouch type lithium secondary battery has a pouch exterior including a metallic foil and a multi-layered synthetic resin film covering the metallic foil layer. The pouch type has been increasingly used and developed as a lightweight lithium secondary battery because it is possible to significantly reduce the weight of the battery in comparison with a polygonal type or a roll type which utilizes a heavier metallic can.

A conventional method of fabricating the pouch type lithium secondary battery will now be described in brief. First, an electrode assembly is arranged on a second side of a pouch exterior having a space for storing an electrode assembly. Then, the second side is covered with a first side of the pouch exterior, and the pouch exterior is sealed, so that a pouch bare cell is obtained. Subsequently, accessories such as a protection circuit module are attached to the pouch bare cell to provide a pouch core pack, and the pouch core pack is inserted into a battery package case, so that a pouch type lithium secondary battery can be finally provided.

However, according to a conventional method of fabricating a pouch type lithium secondary battery, a separate battery package case should be used. Therefore, a fabrication process takes relatively long time. This fact has limited a manufacturing yield of the pouch type lithium secondary battery.

In addition, cost reduction of the pouch type lithium secondary battery has been limited by a separate battery package case.

SUMMARY OF THE INVENTION

Various embodiments of present invention have been made to address the aforementioned problems, and, in some embodiments of the present invention, a pouch type lithium secondary battery and a method of fabricating the same are provided having a simplified packaging process.

In one aspect of the invention, a pouch type lithium secondary battery includes an electrode assembly having a first electrode plate connected to a first electrode tap, a second electrode plate connected to a second electrode tap, and a separator interposed between the first and second electrode plates; and a pouch exterior having an electrode assembly storing portion and a wing portion extending from at least an end of the electrode assembly storing portion, the wing portion entirely winding around side faces of the electrode assembly storing portion.

A protection circuit module may be electrically connected to the electrode assembly and may have an input/output terminal for charging/discharging the electrode assembly.

A first molding unit may also be formed on a first end of the pouch exterior, the first molding unit covering a surface of the protection circuit module except for the input/output terminal provided on the surface of the protection circuit module. A second molding unit may also be formed on a second portion of the pouch exterior. The first molding unit may be formed by hot-melting the pouch exterior, and the hot-melting may use a thermoplastic adhesive. The thermoplastic adhesive may include a material selected from a group consisting of an ethylene-vinyl acetate (EVA) copolymer based material, a polyamide based material, a polyester based material, a rubber based material, and a polyurethane based material.

The battery may also include a first insulation plate and a second insulation plate respectively located at a first portion of the electrode assembly and a second portion of the electrode assembly, and a layer structure of the pouch exterior may include a core layer; a thermoplastic resin layer formed on the core layer; and an insulation layer formed beneath the core layer. The core layer may include aluminum, the thermoplastic resin layer may include casted polypropylene; and the insulation layer may include nylon or polyethylene terephthalate (PET).

The first electrode tap and the second electrode tap, in one embodiment, protrude from the electrode storing portion on a first side, and the wing portion of the pouch exterior extends from a different side of the electrode assembly storing portion than the first side and entirely winds around the side faces of the electrode storing portion.

In another embodiment, the first electrode tap and the second electrode tap protrude from the electrode storing portion on a first side; the wing portion is divided into left and right wing portions extending from opposite sides of the electrode assembly storing portion, the opposite sides being different from the first side; and the left and right wing portions entirely wind around the side faces of the electrode assembly storing portion.

In one embodiment, the first electrode tap and the second electrode tap protrude from the electrode storing portion on a first side; the pouch exterior includes a front plate and a rear plate; the electrode assembly storing portion is closed by sealing edges of the front plate and the rear plate of the pouch exterior; and the wing portion extends from at least one surrounding side of the electrode assembly storing portion, the at least one side being different from the first side.

The front plate and the rear plate may have multiple layers. In on embodiment, the rear plate includes an aluminum core layer, a thermoplastic resin layer formed on the core layer, and an insulation layer formed beneath the core layer and made of nylon or polyethylene terephthalate (PET); and the front plate includes a metallic layer having a higher fracture intensity than that of the aluminum core layer and a thermoplastic resin layer formed beneath the metallic layer.

In another embodiment, the rear plate has a cubic hollow for storing the electrode assembly; the front plate covers an opening of the hollow; and an end of the wing portion terminates at one of four side corners of the cubic hollow, the one of four side corners being different from the first side. The front plate and the rear plate may be further provided by folding a single plate; the wing portion may be divided into left and right wing portions extending from opposite sides of the electrode assembly storing portion; and one of the left and right wing portions may cover a side face of the electrode assembly storing portion corresponding to the front plate, and the other of the left and right wing portions covers a side face of the electrode assembly storing portion corresponding to the rear plate.

In one embodiment, the front plate and the rear plate have different areas, and only one of the front plate and the rear plate extends from one surrounding side of the electrode assembly storing portion to provide at least a part of the wing portion.

One embodiment of a method of fabricating a pouch type lithium secondary battery, includes preparing a pouch including a front plate and a rear plate folded along a folding line, the rear plate having an electrode assembly storing space; storing an electrode assembly in the electrode assembly storing space, the electrode assembly including a first electrode plate connected to a first electrode tap, a second electrode plate connected to a second electrode tap, and a separator interposed between the first electrode plate and the second electrode plate; forming a pouch bare cell by sealing edges of the front plate and the rear plate of the pouch; and wrapping the electrode assembly with the pouch by winding around the electrode assembly storing space with a part of the pouch bare cell to provide a shape of a pouch exterior. The electrode assembly storing space may be disposed near a left or right end of the rear plate of the pouch.

Another embodiment includes installing a protection circuit module in a first portion of the pouch exterior and electrically connecting the protection circuit module having an input/output terminal on a surface of the protection circuit module to the first electrode tap and the second electrode tap of the electrode assembly. The embodiment may also include forming a first molding unit that covers the protection circuit module on the pouch exterior by hot-melting the pouch exterior while the input/output terminal is exposed to an outside of the pouch exterior.

The forming of the pouch bare cell may include partially sealing a part of the pouch to provide a gas collecting space, a first path connecting the electrode assembly storing space to the gas collecting space, and a second through-hole connecting the gas collecting space to an outside of the pouch exterior; injecting electrolyte through the second through-hole to soak the electrode assembly; sealing the second through-hole; performing initial charge/discharge of the electrode assembly to collect gases in the gas collecting space; and removing the gases in the first through-hole and the gas collecting space and sealing the first through-hole and the gas collecting space by hot-melting. The second through-hole may connect the gas storing space to the outside at a peripheral side of the gas storing space that is opposite to the electrode assembly storing space, and the first through-hole may be arranged between the electrode assembly storing space and the gas storing space.

Another embodiment of a method includes preparing a pouch member including a rear plate having an electrode assembly storing space and a front plate that covers the electrode assembly storing space; storing an electrode assembly in the electrode assembly storing space, the electrode assembly including a first electrode plate connected to a first electrode tap, a second electrode plate connected to a second electrode tap, and a separator interposed between the first and second electrode plates; forming a pouch bare cell by arranging the front plate and the rear plate such that the front plate covers the electrode assembly storing space and sealing the front plate and the rear plate at a circumferential area around the electrode assembly storing space to partially bond the front plate and the rear plate with each other; and wrapping the pouch bare cell by entirely winding around the electrode assembly storing space with at least a part of the circumferential area. The front plate may include a core layer, and the core layer may have a higher fracture intensity than that of the rear plate.

Another embodiment of a method includes preparing a pouch member having a front plate and a rear plate having different areas, the rear plate having an electrode assembly storing space formed in a part of the rear plate, and the front plate covering the electrode assembly storing space; storing an electrode assembly in the electrode assembly storing space, the electrode assembly including a first electrode plate to which a first electrode tap is attached, a second electrode plate to which a second electrode tap is attached, and a separator interposed between the first electrode plate and the second electrode plate; forming a pouch bare cell by arranging the front plate and the rear plate such that the front plate covers the electrode assembly storing space and sealing the front and rear plates at a circumferential area around the electrode assembly storing space to partially bond the front plate and the rear plate with each other; and wrapping the pouch bare cell by winding around the electrode assembly storing space with a part of the circumferential area such that a unsealed part of the circumferential area winds around at least a part of the electrode assembly storing space.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION

Figure 1A:
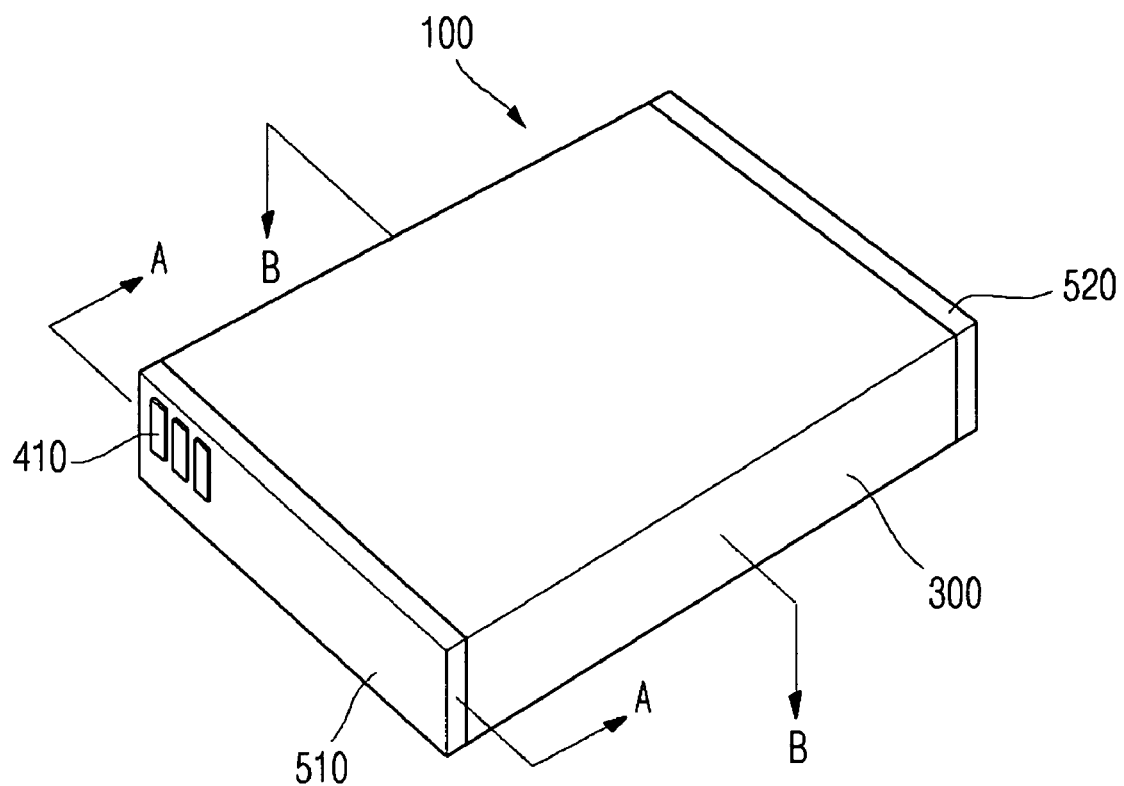
FIG. 1A is a perspective view of a pouch type lithium secondary battery according to an embodiment of the present invention.

Hereinafter, exemplary embodiments of the present invention will be described in detail with reference to accompanying drawings, in which like reference numerals denote like elements.

Figure 1B:
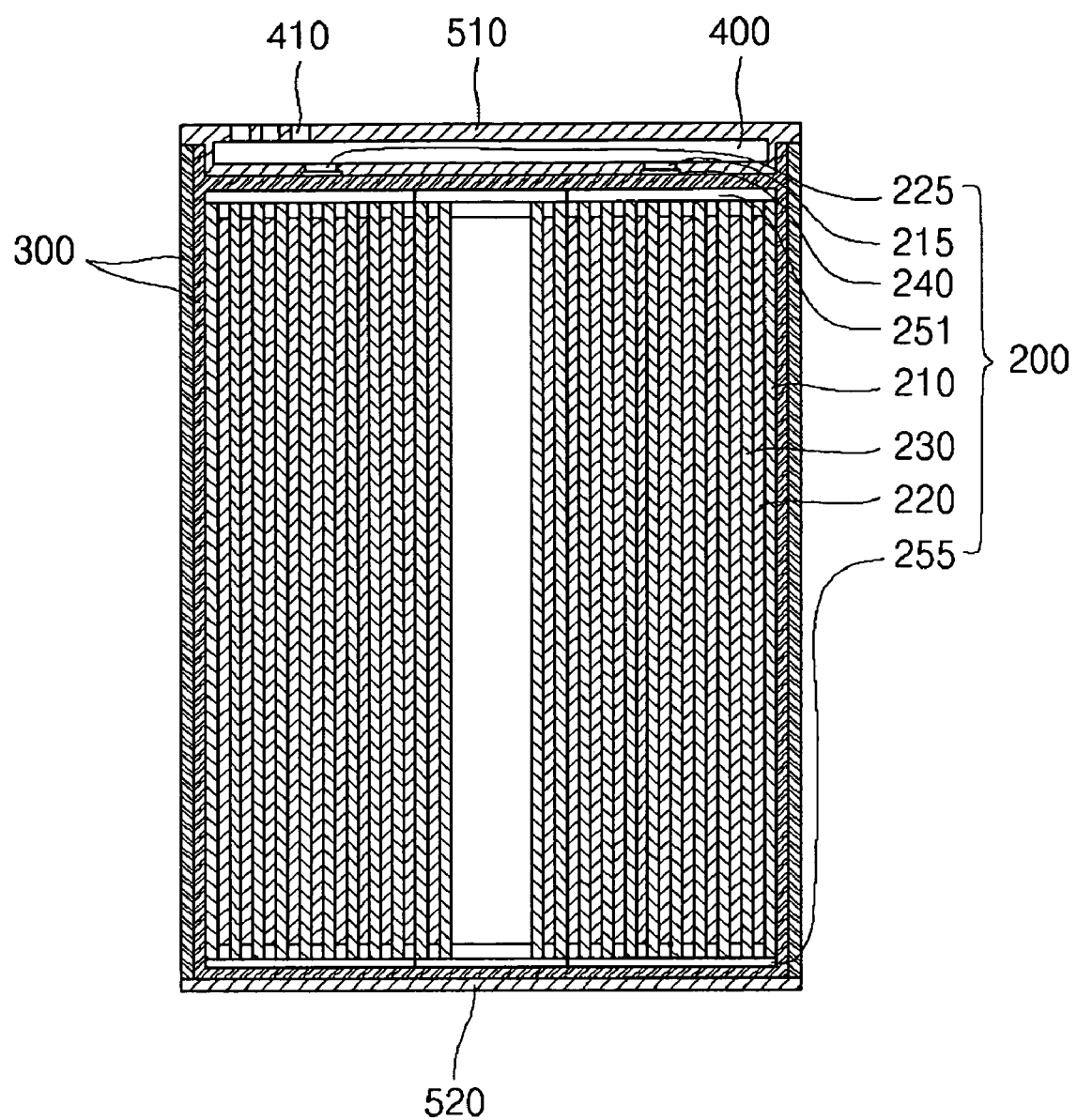
FIG. 1B is a longitudinal cross-sectional view across a line A-A of FIG. 1A.

FIG. 1A is a perspective view illustrating a pouch type lithium secondary battery according to an embodiment of the present invention; FIG. 1B is a cross-sectional view across a line A-A of FIG. 1A; and FIG. 1C is a cross-sectional view across a line B-B of FIG. 1A.

Figure 1C:
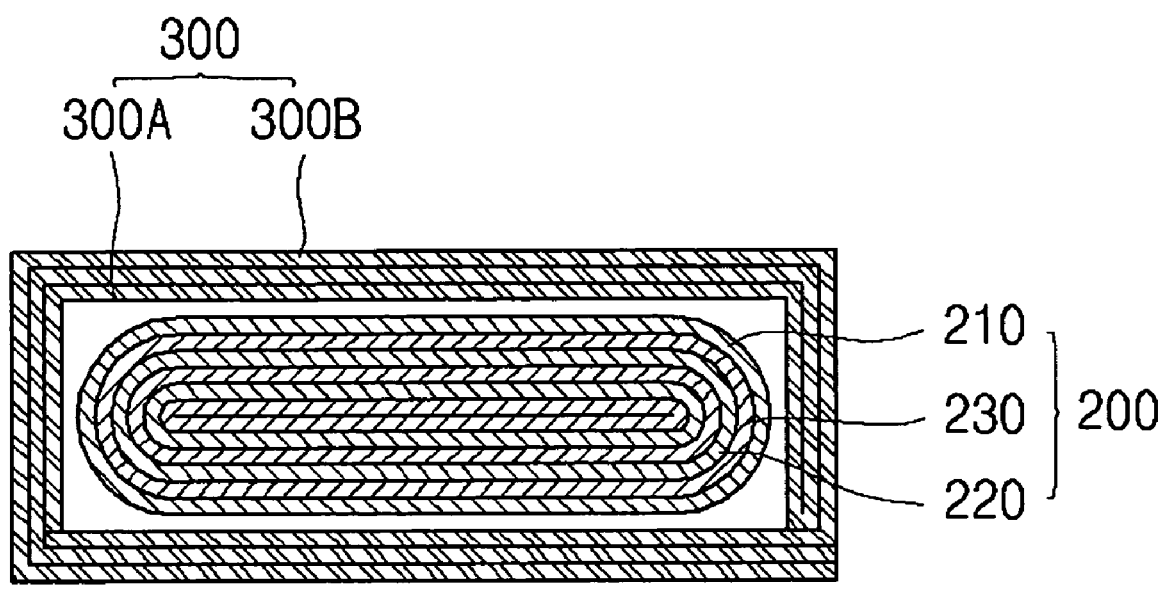
FIG. 1C is a transverse cross-sectional view across a line B-B of FIG. 1A.

Referring to FIGS. 1A through 1C, a pouch type lithium secondary battery 100 according to an embodiment of the present invention includes: an electrode assembly 200; a pouch exterior 300 storing the electrode assembly 200; a protection circuit module 400 for controlling charge/discharge of the electrode assembly 200; and first/second molding units 510 and 520 formed by a hot-melting.

The electrode assembly 200 includes a first electrode plate 210 having a coating made of one of positive and negative active materials; a second electrode plate 220 having a coating made of the other of the positive and negative active materials; and a separator 230 arranged between the first and second electrode plates 210 and 220 to prevent a short circuit between the first and second electrode plates 210 and 220 and allow only lithium ions to pass through the separator 230. In addition, a first electrode tap 215 made of aluminum is bonded to the first electrode plate 210 and protrudes by a predetermined length to function as a positive electrode tap. Similarly, a second electrode tap 225 made of Ni is bonded to the second electrode plate 220 and protrudes by a predetermined length to function as a negative electrode tap. However, the materials of the first and second electrode taps 215 and 225 according to the present invention are not limited to the aforementioned ones. An insulation tape 240 may be further included for preventing a short between the first and second electrode taps 215 and 225 and the pouch exterior 300. In addition, the first and second electrode taps 215 and 225 extend outside of the pouch exterior 300 and are electrically connected to the protection circuit module 400. Furthermore, first/second insulation plates 251 and 255 may be further provided on both ends of the electrode assembly 200 to prevent the electrode assembly 200 from making contact with the pouch exterior 300.

The positive active material may be chalcogenide compounds, e.g., metallic oxide compounds such as $LiCoO_2$, $LiMn_2O_4$, $LiNiO_2$, $LiNi_{1-x}Co_xO_2$ ($0<x<1$), $LiMnO_2$, and the like. The negative active material may be selected from a group consisting of a carbon based material, Si, Sn, tin oxides, composite tin alloys, transition metal oxides, lithium metallic nitrides, or lithium metallic oxides. Also, the positive electrode plate is made of an aluminum material, and the negative electrode plate is made of a copper material. The separator is usually made of polyethylene or polypropylene. However, the present invention is not limited to the aforementioned materials.

According to this embodiment, the first and second electrode taps 215 and 225 of the pouch type lithium secondary battery 100 protrude out of a first side of the pouch exterior 300.

The pouch exterior 300 includes: an electrode assembly storing portion 300A for storing the electrode assembly 200; and a wing portion 300B extending from one side of the electrode assembly storing unit 300A. It should be noted that the wing portion 300B of the pouch exterior 300 in this embodiment is made to wind around the electrode assembly storing portion 300A. That is, the wing portion 300B of the pouch exterior 300 has a shape that entirely winds around the electrode assembly storing portion 300A.

The pouch exterior 300 has a layer structure including a core layer made of metal such as aluminum, a thermoplastic resin layer formed on the core layer, and an insulation film formed beneath the core layer. The thermoplastic resin layer may be made of a polymer resin, e.g., modified polypropylene such as casted polypropylene and functions as a bonding layer. The insulation film may be made of a resin material such as nylon or polyethylene terephthalate (PET). However, the pouch exterior 300 according to the present invention is not limited to the aforementioned configuration and materials.

The protection circuit module 400 is disposed on a first end of the pouch bare cell 300 and electrically connected to the first and second electrode taps 215 and 225 of the electrode assembly 200, so as to control charge/discharge and error operations in the electrode assembly 200. For example, the protection circuit module 400 cuts off an excessive current in the electrode assembly 200. In addition, the protection circuit module 400 has an input/output terminal 410 on the protection circuit module 400 for charging/discharging the pouch type lithium secondary battery 100. Although not shown in the drawing, various protection circuits can be included in the protection circuit module 400.

The first and second molding units 510 and 520 are molded by a hot melting method. The first and second molding units 510 and 520 allow the pouch exterior 300 to consistently have a tubular shape.

In addition, the hot-melt material used in the first and second molding units 510 and 520 may be a thermal type adhesive. The hot-melt material may be a nonvolatile, nonflammable thermoplastic resin which is 100% solid at an atmospheric temperature. In this embodiment, the hot-melt material is melt at a high temperature and applied to an adherend using no water or solvent. Then, the hot-melt material is pressed, and cooled or solidified in a few seconds so as to have adhesion.

The hot-melt material used in the first and second molding units 510 and 520 may be selected from a group consisting of an ethylene-vinyl acetate copolymer (EVA) based material, a polyamide based material, a polyester based material, a rubber based material, and a polyurethane based material.

In addition, the first molding unit 510 may be formed by molding a first portion of the pouch exterior 300, on which the protection circuit module 400 is mounted, by a hot-melting method. The first molding unit 510 is formed such that the input/output terminal 410 of the protection circuit module 400 is exposed. In other words, the first molding unit 510 covers the protection circuit module 400 that is disposed in a first portion of the pouch exterior 300 while exposing the input/output terminal 410.

Similarly, the second molding unit 520 may be formed by molding a second portion of the pouch exterior 300 by a hot-melting method. Since a packaging process for the pouch type lithium secondary battery 100 according to the present invention is performed by using the pouch exterior 300, a second portion of the pouch type lithium secondary battery 100 is relatively vulnerable to external attacks such as a thrust. Therefore, the second molding unit 520 is provided to reinforce the second portion.

In the present embodiment, it is supposed that the wing portion of the pouch exterior 300 is extended from only one end, from which the electrode tap does not protrude, of the surrounding sides of the electrode assembly storing portion, and both the sealed plates (i.e., the front and rear plates of the pouch exterior 300) are connected with each other to form a single body. However, the wing portion according to the present invention may be extended from both, opposite ends of the electrode assembly storing portion. Also, the front and rear plates may be two separate members, and/or may have different areas, layer structures, or materials.

Figure 2:
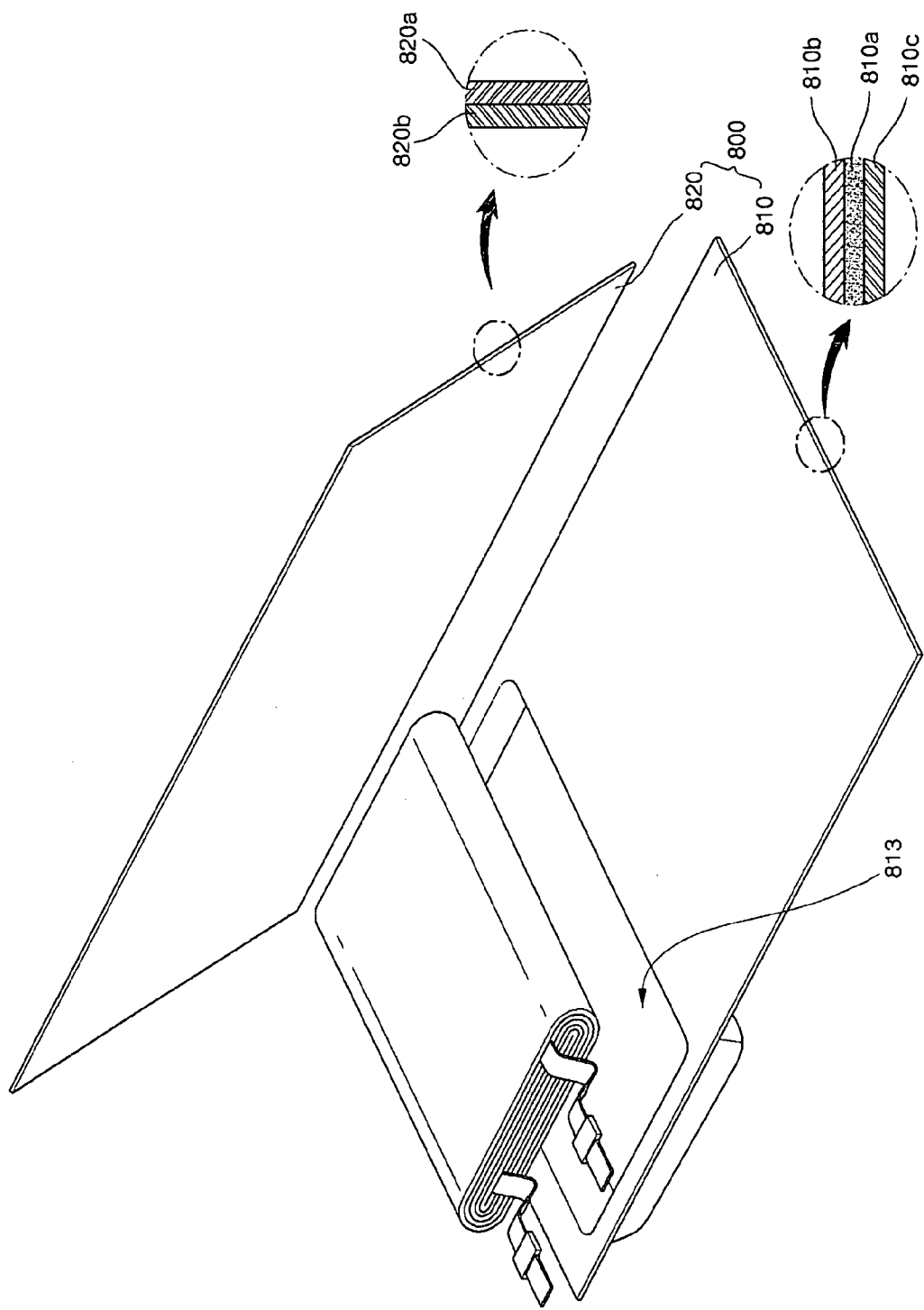
FIG. 2 is a perspective view illustrating a layer structure of a pouch exterior according another embodiment of the present invention.

For example, as shown in FIG. 2 which illustrates partially enlarged views of the layer structures of the front and rear plates, the rear plate 810 of the pouch exterior 800 includes an aluminum core layer 810$a$; a thermoplastic resin layer 810$b$ formed of, for example, CPP (Casted Polypropylene) on the aluminum core layer 810$a$; and an insulation layer 810$c$ formed of, for example, nylon or PET (Polyethylene Terephthalate) beneath the aluminum core layer 810$a$, while the front plate 820 may include a metallic core layer 820$a$ formed of, for example, stainless steel having a higher fracture intensity than aluminum; and a thermoplastic resin layer 820$b$ formed of, for example, CPP on the metallic core layer 810$b$.

Figure 3A:
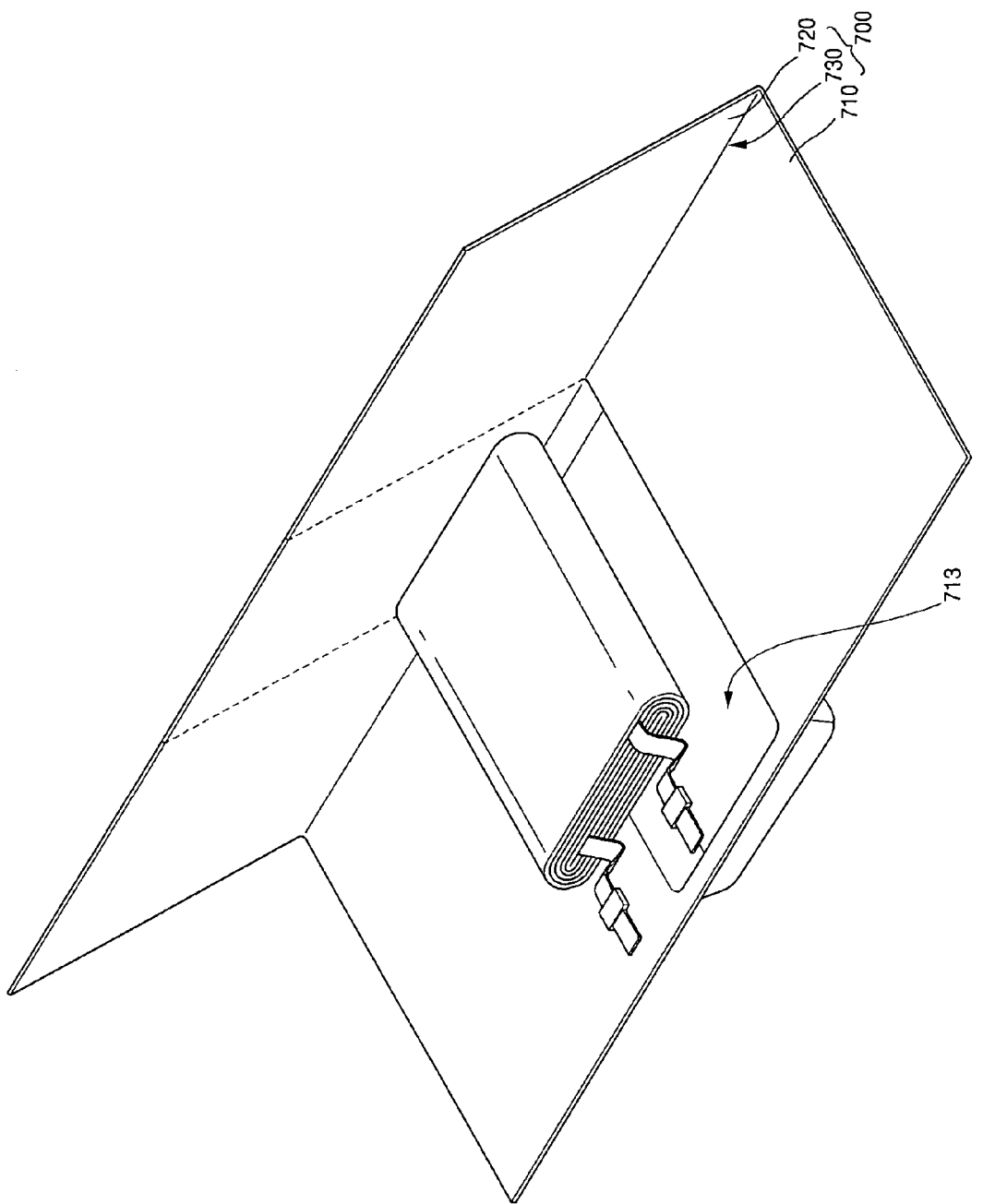
FIG. 3A is a perspective view illustrating a pouch type lithium secondary battery during a fabricating process according to another embodiment of the present invention.
Figure 3B:
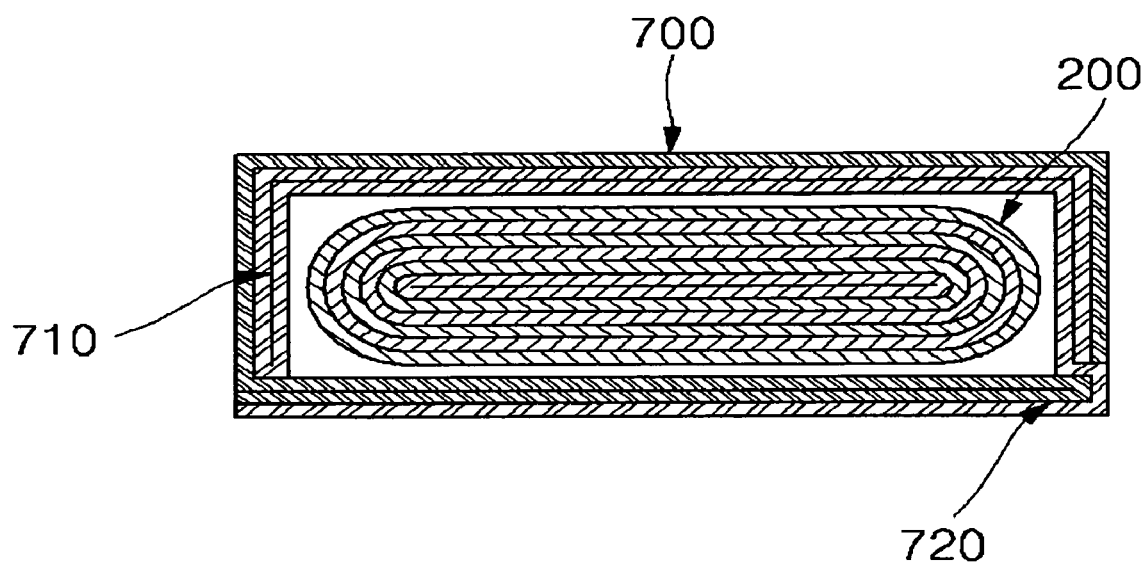
FIG. 3B is a transverse cross-sectional view of the fabricated pouch type lithium secondary battery of FIG. 3A.

FIG. 3A is a perspective view of a pouch type lithium secondary battery at one stage of its fabrication according to an embodiment of the present invention, in which the pouch exterior 700 is folded to provide the front and rear plates 720 and 710. FIG. 3B is a transverse cross-sectional view of the fabricated pouch type lithium secondary battery of FIG. 3A.

Referring to FIGS. 3A and 3B, as a space for storing the electrode assembly 200, there is a rectangular hollow 713 in the center of the rear plate 710 of the pouch exterior 700. The rear and front plates 720 and 710 are bonded with each other so that the hollow 713 of the rear plate 710 is covered with the front plate 720. In this stage, the left and right wing portions extending from the hollow 713 to the left and right ends are rolled around the electrode assembly storing portion of the rear plate 710 in the same direction to wind around the electrode assembly storing portion of the rear plate 710. As a result, the left and right wing portions of the front plate 720 wind the wing portions of the rear plate 710 around four faces (i.e., two narrow faces and two wide faces) of the cubic pouch. More specifically, the left and right wing portions of the front and rear plates 720, 710 wind around the front and rear wide faces and the left and right narrow faces of the cubic pouch, and the electrode taps protrude through another face.

Figure 4A:
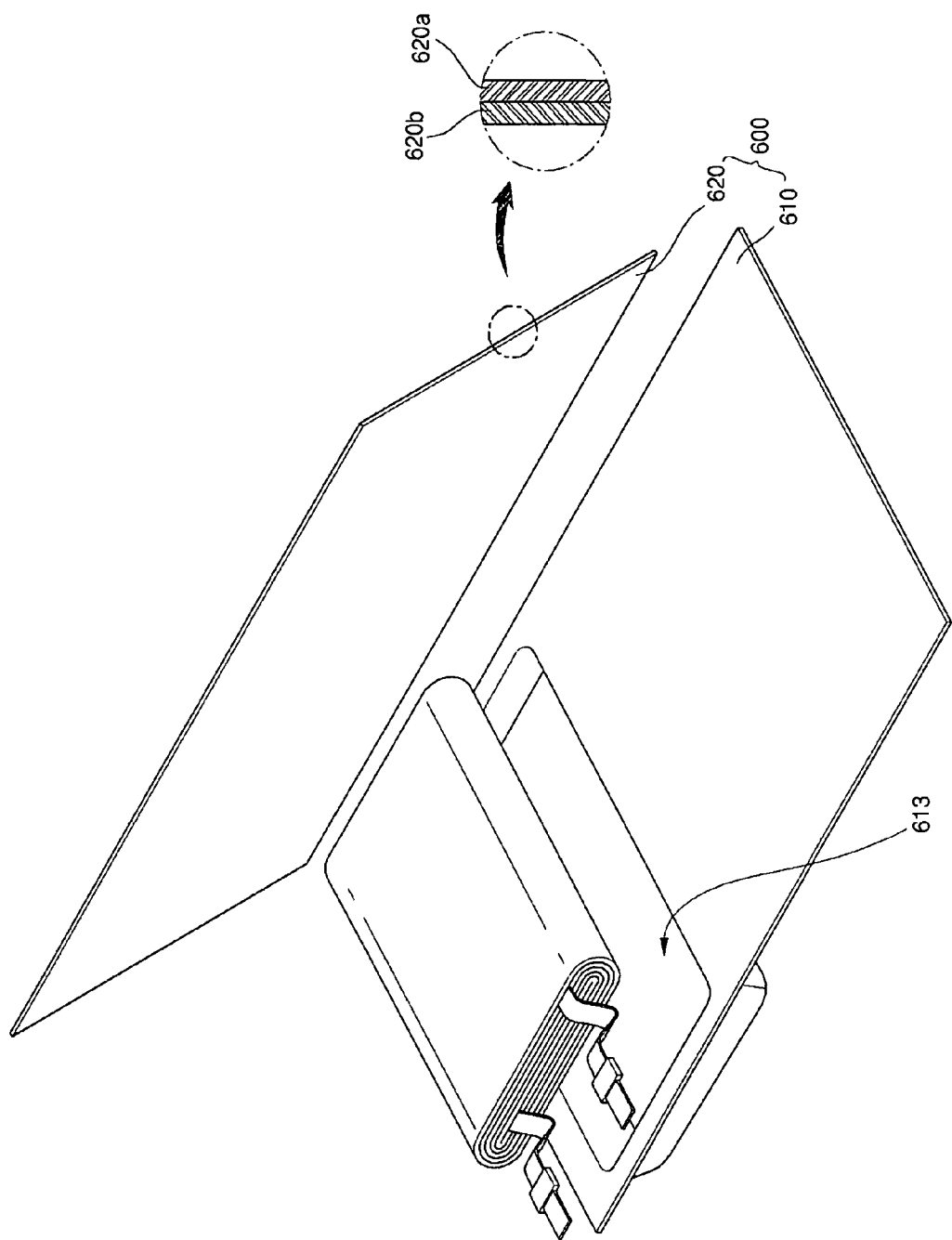
FIG. 4A is a perspective view illustrating a pouch type lithium secondary battery during a fabricating process according to still another embodiment of the present invention.
Figure 4B:
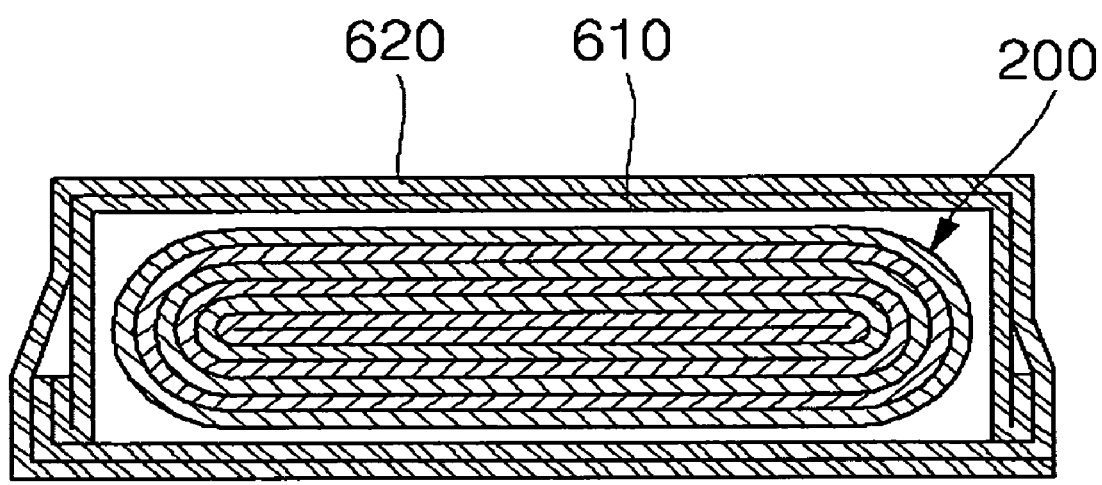
FIG. 4B is a transverse cross-sectional view of the fabricated pouch type lithium secondary battery of FIG. 4A.

FIG. 4A is a perspective view a pouch type lithium secondary battery at one stage of its fabrication according to another embodiment of the present invention, and FIG. 4B is a transverse cross-sectional view of the fabricated pouch type lithium secondary battery of FIG. 4A.

Referring to FIGS. 4A and 4B, the front and rear plates have different layer structures as shown in FIG. 2. Also, a cubic hollow 613 for storing the electrode assembly in the rear plate 610 is disposed near the left end of the pouch exterior 600. Narrow surrounding portions on the left and right sides around the opening of the hollow 613 are sealed, and unsealed remaining portions of the front plate function as a wing portion for winding around the electrode assembly storing space. As a result, four side faces of the electrode assembly storing space can be covered by the strong metallic front plate 620. In order to improve damage tolerance, the wing portion may be extended longer to wind around the electrode assembly storing space in one and a half or two turns as necessary.

In the aforementioned embodiments, as shown in FIGS. 1C, 3B, and 4B, it should be noted that all the ends of the wing portions are terminated at the corner of the cubic space for storing the electrode assembly. In other words, supposing the face through which the electrode taps protrude is a first face of the cubic space, the end of the left or right wing portion is terminated in one of the four corners where four side faces of the cubic space meet. If the end of the left or right wing portion is terminated in the middle of side face, steps or protrusions may be generated on the side face, thereby limiting effective space.

Figure 5:
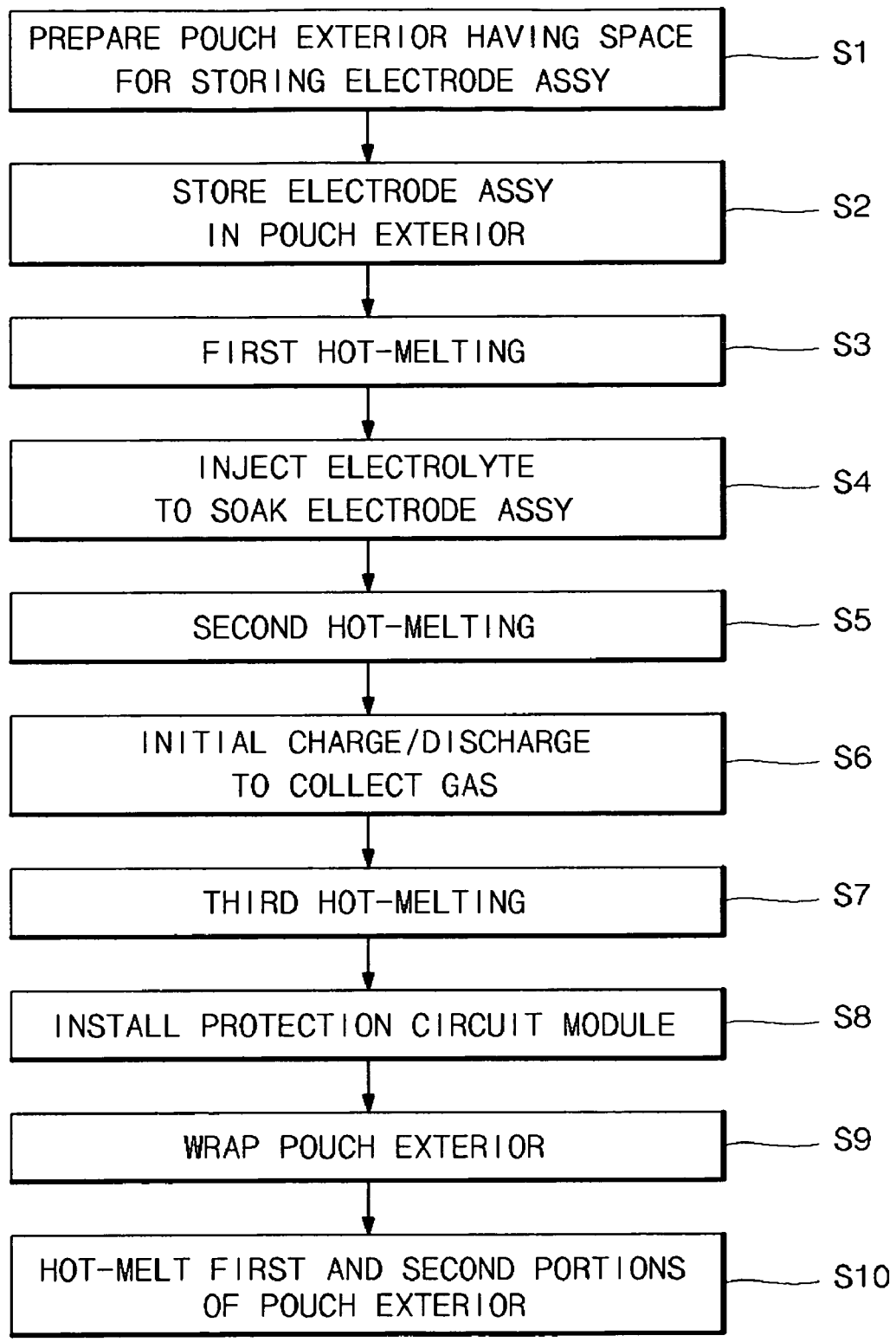
FIG. 5 is a flowchart illustrating a method of fabricating a pouch type lithium secondary battery according to an embodiment of the present invention.

FIG. 5 is a flowchart illustrating a method of fabricating a pouch type lithium secondary battery according to an embodiment of the present invention.

Referring to FIG. 5, a method of fabricating a pouch type lithium secondary battery according to an embodiment of the present invention includes: S1) preparing a pouch having an electrode assembly storing space; S2) storing the electrode assembly in the pouch; S3) firstly sealing the pouch; S4) injecting electrolyte to soak the electrode assembly in the electrolyte; S5) secondly sealing the pouch; S6) performing initial charge/discharge to collect gases; S7) thirdly sealing the pouch; S8) installing a protection circuit module; S9) wrapping the pouch; and S10) hot-melting first and second portions.

FIGS. 6A through 6E are schematic perspective views of a pouch type lithium secondary battery at various stages of fabrication according to an embodiment of a method of the present invention. A method of fabricating a pouch type lithium secondary battery according to an embodiment of the present invention will now be described with reference to FIG. 5 and FIGS. 6A through 6E.

Figure 6A:
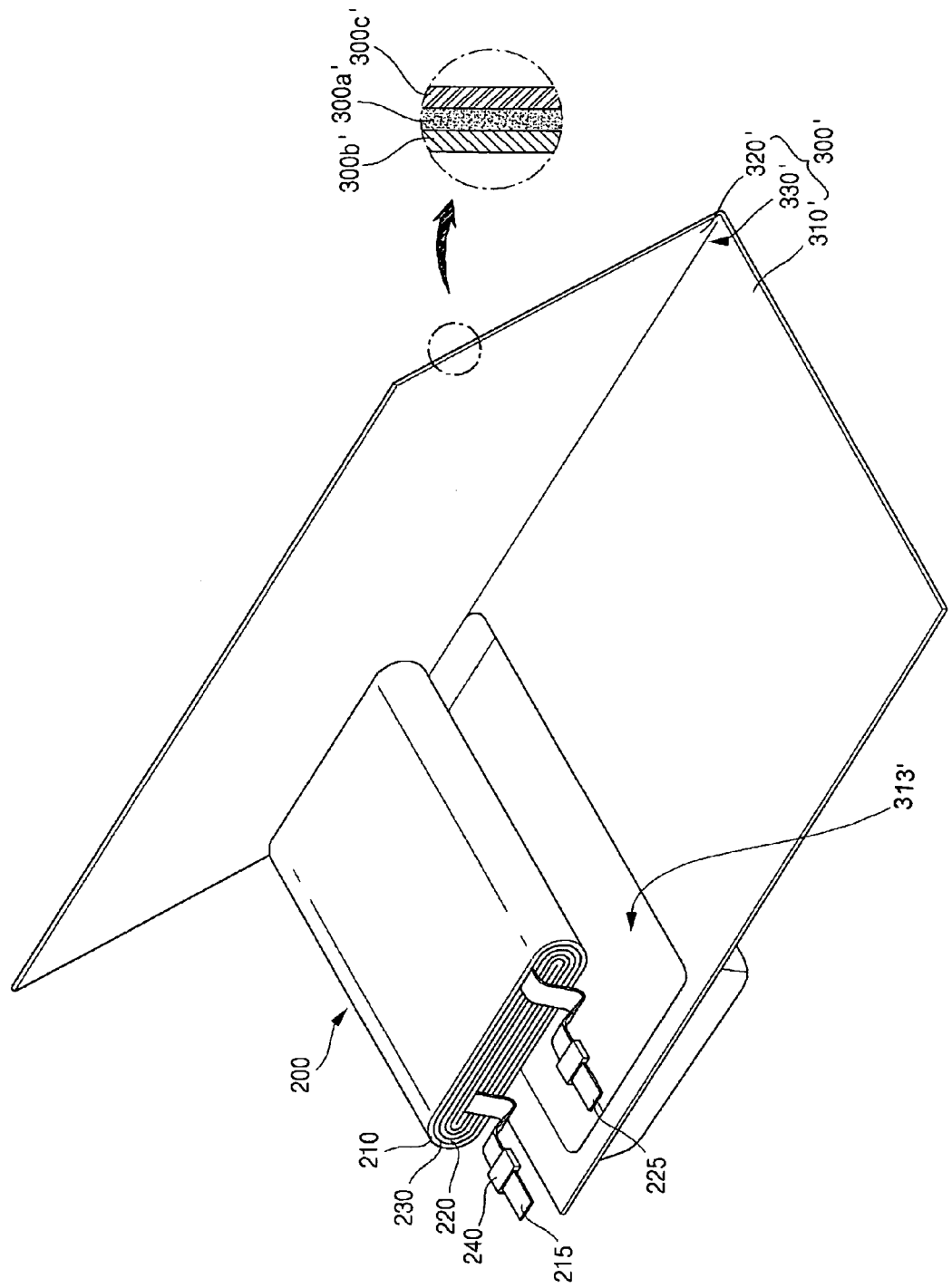
FIGS. 6A through 6E are schematic views of a pouch type lithium secondary battery at stages of a fabricating process according to an embodiment of the present invention.

First, in the process of preparing a pouch having an electrode assembly storing space (S1), as shown in FIG. 6A, a pouch exterior 300' is prepared. The pouch member is folded along a folding line 330' to discriminate the front and rear plates 320' and 310'. The rear plate 310' is provided with a hollow 313' for storing the electrode assembly.

It should be noted that the hollow 313' functioning as an electrode assembly storing space is disposed near the left or right end of the rear plate 310', in this embodiment. In addition, the pouch exterior 300' has a long enough area to wind around the electrode assembly 200 in one or more turns while the electrode assembly is stored.

The layer structure of the pouch exterior 300' includes: a core layer 300$a$' made of a metallic material such as aluminum; a thermoplastic resin layer 300$b$' formed on the core layer 300$a$'; and an insulation layer 300$c$' formed beneath the core layer 300$a$'. The thermoplastic resin layer 300$b$' may be made of polymer such as casted polypropylene (CPP) and function as a bonding layer. The insulation layer 300$c$' may be made of a resin material such as nylon or PET (Polyethylene Terephthalate). However, the material and the layer structure of the pouch exterior 300' are not limited to the aforementioned materials.

In the process of storing the electrode assembly in the pouch (S2), as shown in FIG. 6A, the electrode assembly 200 is prepared, and the electrode assembly 200 is stored in the electrode assembly storing space 313' of the pouch exterior 300'. In this case, the first and second electrode taps 215 and 225 protrude from a first side of the electrode assembly 200 to the outside of the pouch exterior 300'.

The sequence of the process of preparing the electrode assembly 200 and the pouch exterior 300' is not limited to that described above, but the pouch exterior 300' can be prepared after the electrode assembly 200 is prepared.

Although not shown in the drawing, first and second insulation plates may be further attached to respective portions of the electrode assembly 200 in order to prevent the electrode assembly 200 from making contact with the pouch exterior 300'.

Figure 6B:
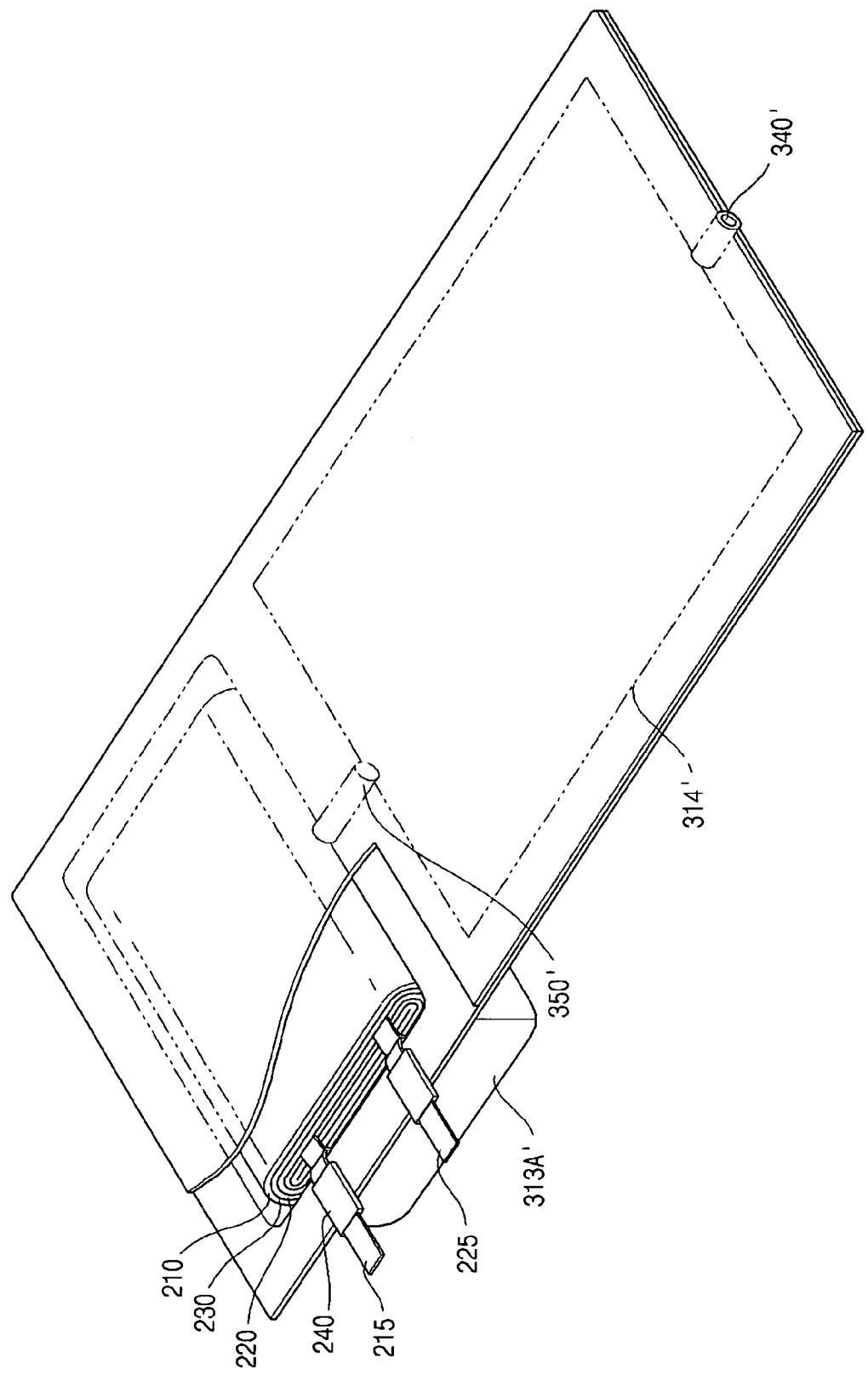

In the process of firstly sealing the pouch exterior (S3), as shown in FIG. 6B, the pouch exterior is folded along the folding line 330', and the front and rear plates are bonded with each other.

In the first sealing process (S3), while the edges of the pouch exterior and most of the circumferences around the hollow 313' are sealed, a gas collecting space 314' is formed beside the hollow 313'. In addition, one end of the gas collecting space 314' is opened to provide a first thru-hole 340' connecting the gas collecting space 314' to outside. Similarly, the opposite end of the gas collecting space 314' is opened to provide a second thru-hole 350' connecting the hollow 313' to the gas collecting space 314'. In other words, the second thru-hole 350' functions as a path between the hollow 313' and the gas collecting space 314'.

Also, the hollow 313' functions as an electrode assembly storing portion 313A' through the first sealing process (S3), in which the electrode assembly 200 is stored and then the front and rear plates are bonded with each other.

In the process of injecting electrolyte to soak the electrode assembly in the electrolyte (S4), while the pouch exterior 300' is erected such that the gas collecting space 314' becomes upside, the electrolyte is injected through the first thru-hole 340', and exposed to a vacuum atmosphere to soak the electrode assembly 200 in the electrolyte.

Figure 6C:
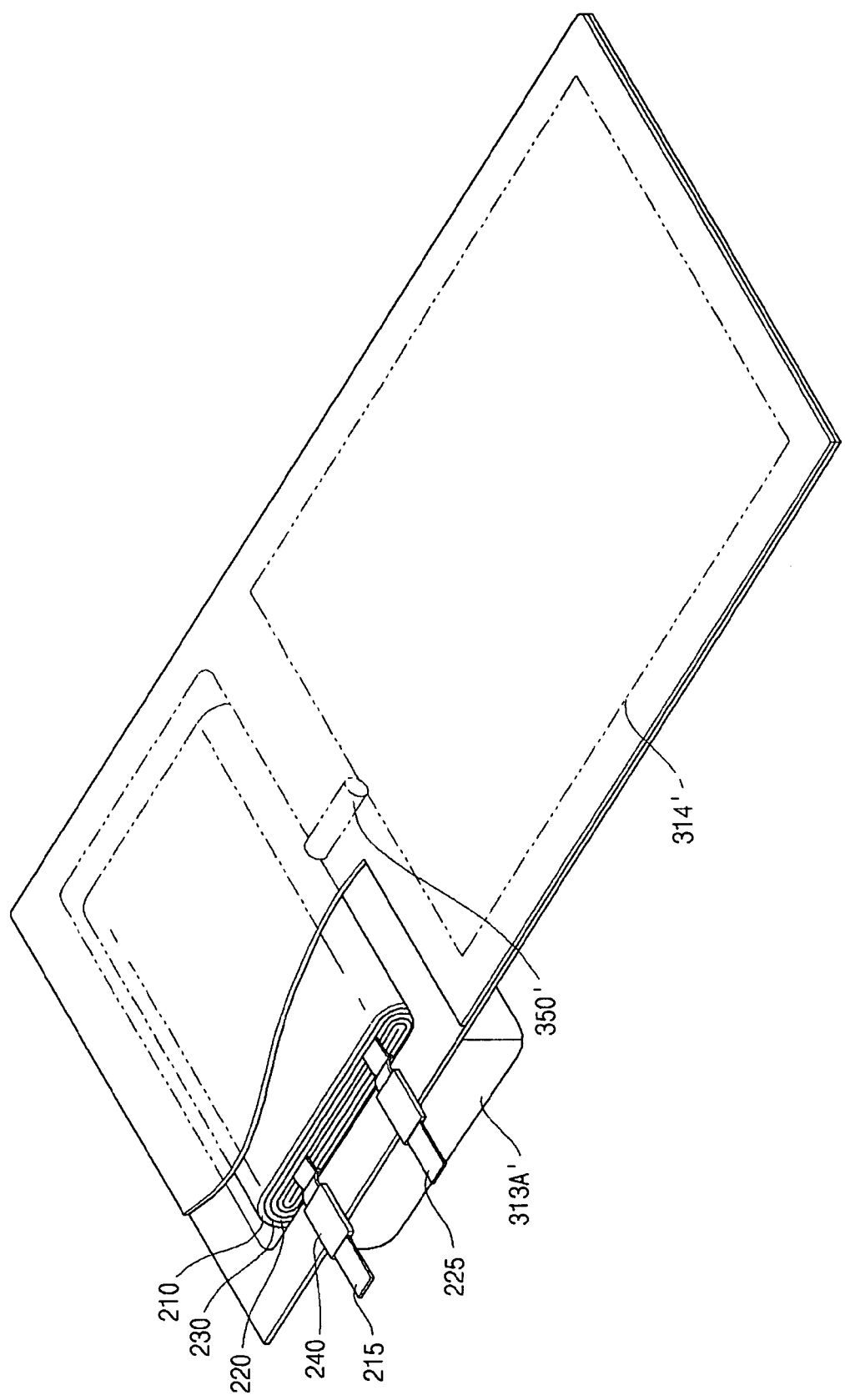

In the process of secondly sealing the pouch (S5), as shown in FIG. 6C, the first thru-hole 340' of the pouch exterior 300' is sealed after the electrolyte is injected and the electrode assembly 200 is soaked.

In the process of performing initial charge/discharge to collect gases (S6), as shown in FIG. 6C, while the pouch exterior 300' is erected such that the gas collecting space 314' becomes upside after the first thru-hole 340' is sealed, initial charge/discharge is performed. During the initial charge/discharge, gases are generated in the electrode assembly 200. The gases are collected in the gas collecting space 314' through the second thru-hole 350'.

Figure 6D:
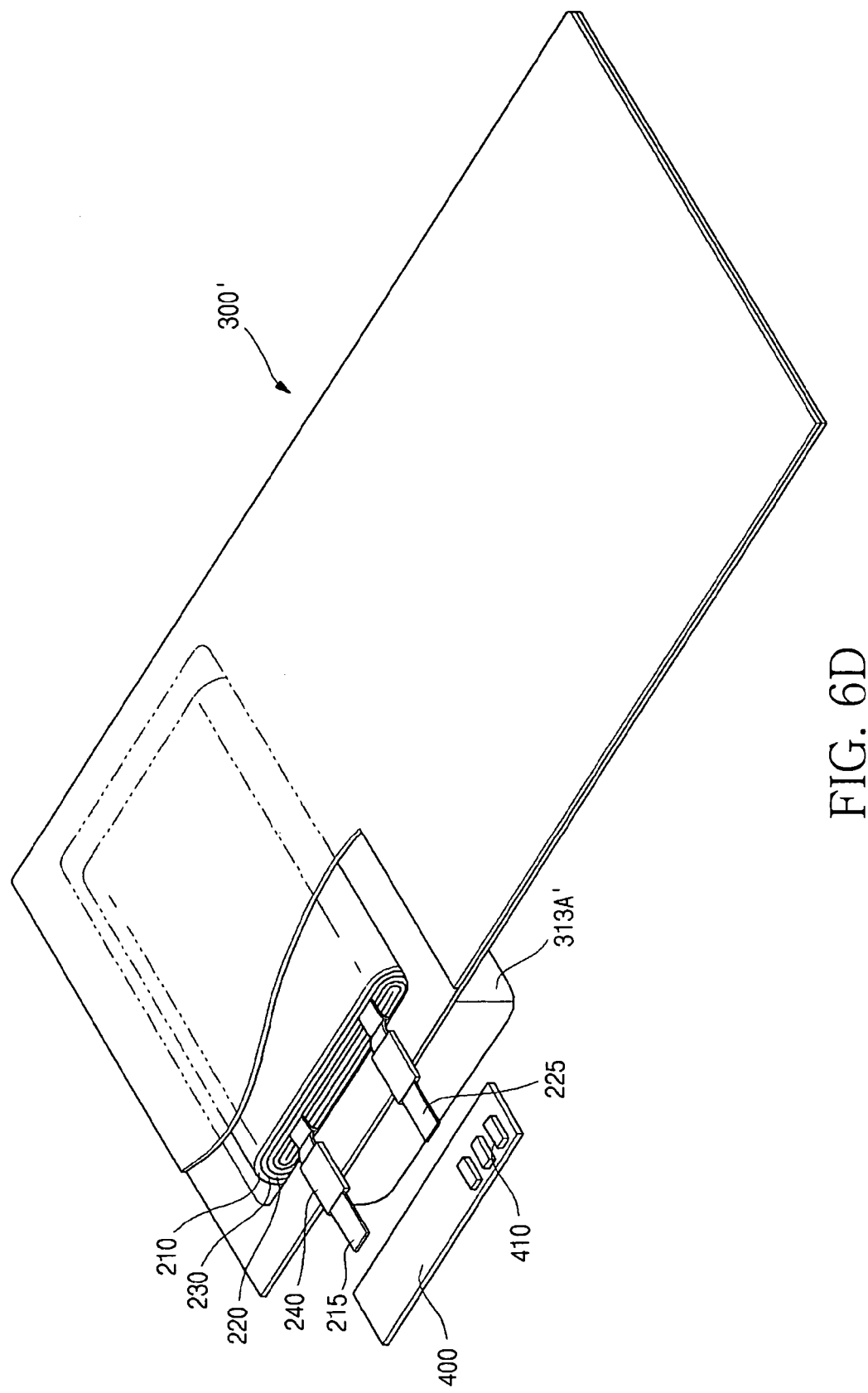

In the process of thirdly sealing the pouch exterior (S7), as shown in FIG. 6D, the second thru-hole 350' is sealed after the gases generated during the initial charge/discharge are collected in the gas collecting space 314'. Also, the gas collecting space 314' is sealed, and the gases are vented to outside, thereby forming a pouch bare cell.

In the process of installing a protection circuit module (S8), after the third sealing process is performed, the protection circuit module 400 is electrically connected to the electrode assembly via the first and second electrode taps 215 and 225 protruding from the first side of the pouch bare cell.

It should be noted that the protection circuit module 400 includes various protection circuits and an input/output terminal 410 for charging/discharging the electrode assembly 200 to control charge/discharge of the electrode assembly 200 and error operations.

In the process of wrapping the pouch (S9), after the protection circuit module 400 is installed, the sealed pouch exterior is wound around the electrode assembly storing space in one turn, thereby enclosing a periphery of the electrode assembly storing space.

It should be noted that the present invention is not limited to the aforementioned sequence of the process of installing the protection circuit module (S8) and the process of wrapping the pouch (S9). Instead, the process of wrapping the pouch (S9) may be performed before the process of installing the protection circuit module (S8).

Figure 6E:
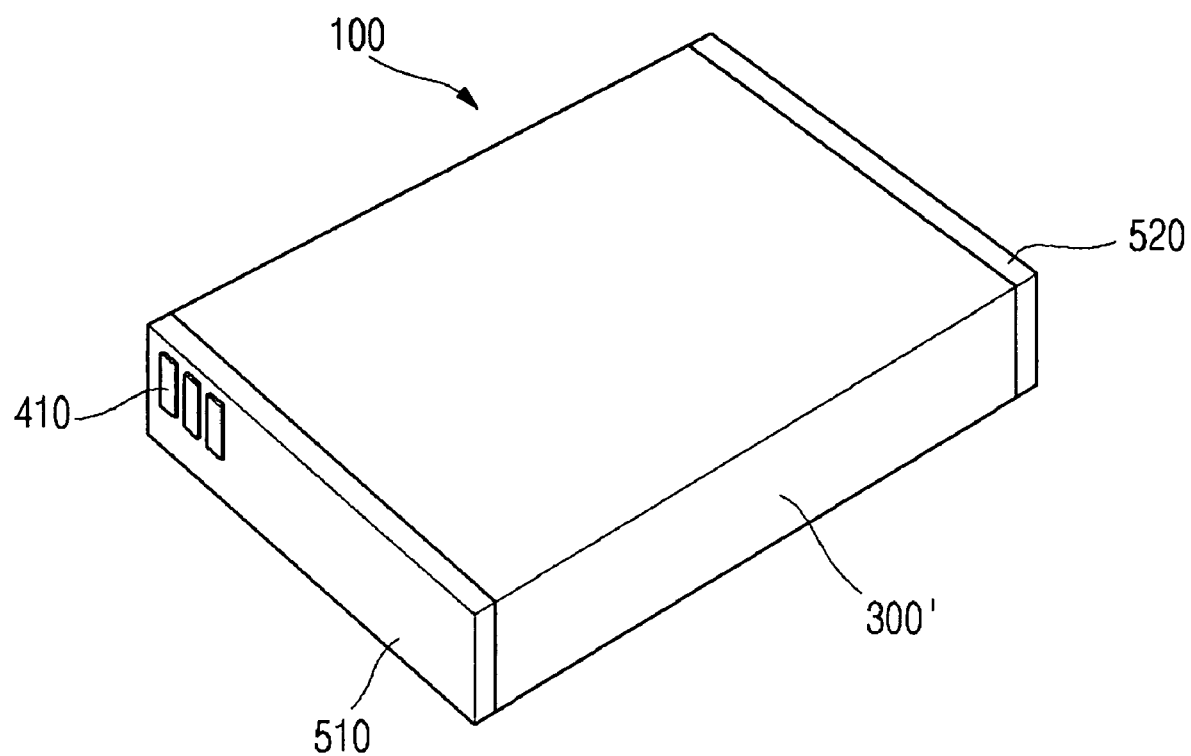

As shown in FIG. 6E, In the process of hot-melting first and second portions (S10), after the electrode assembly storing space is wrapped by the pouch exterior, the first portion of the pouch bare cell to which the protection circuit module is connected and the second portion of the pouch bare cell are hot-melted to form first and second molding units 510 and 520, thereby providing a complete pouch type lithium secondary battery 100.

In this case, the input/output terminal 410 of the protection circuit module 400 may be exposed to outside of the first molding unit 510 when the first and second portions are hot-melted.

As a result, the entire shape of the pouch around the electrode assembly can be maintained due to the first and second molding units formed on first and second portions of the pouch.

Figure 7:
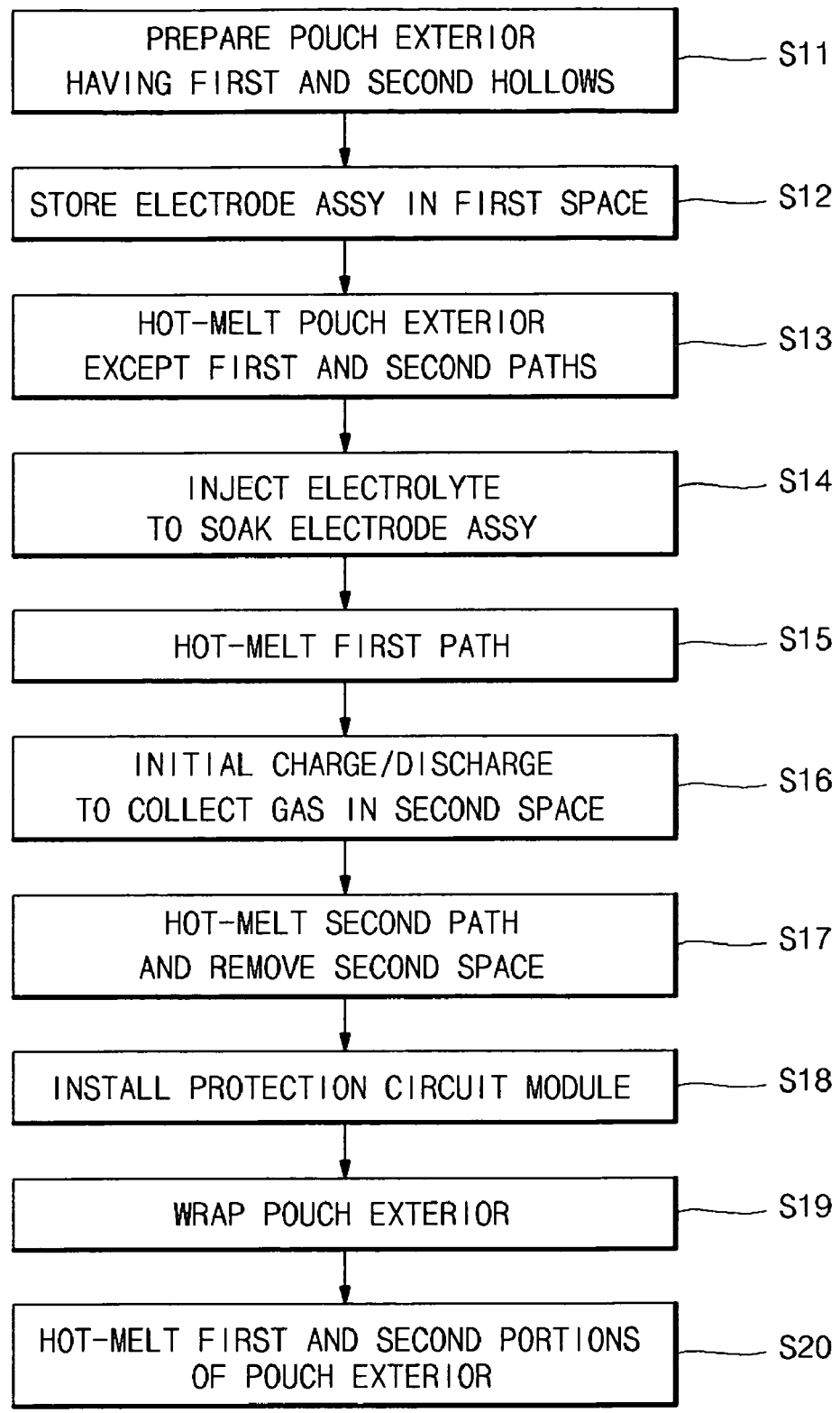
FIG. 7 is a flowchart illustrating a fabricating process according to another embodiment of the present invention.

FIG. 7 is a flowchart illustrating a method of fabricating a pouch type lithium secondary battery according to another embodiment of the present invention.

Referring to FIG. 7, a method of fabricating a pouch type lithium secondary battery according to another embodiment of the present invention includes: S11) preparing a pouch exterior having first and second hollows; S12) storing the electrode assembly in the first hollow; S13) sealing the pouch exterior except for first and second paths; S14) injecting electrolyte to soak the electrode assembly; S15) sealing the first path; S16) performing initial charge/discharge and collect gases in the second hollow; S17) sealing the second path to remove the second path; S18) installing the protection circuit module; S19) wrapping the electrode assembly with the pouch exterior; and S20) hot-melting the first and second portions of the pouch exterior.

FIGS. 8A through 8E are schematic perspective views of a pouch type lithium secondary battery at various stages of fabrication according to another embodiment of a method of the present invention. A method of fabricating a pouch type lithium secondary battery according to another embodiment of the present invention will now be described with reference to FIG. 7 and FIGS. 8A through 8E.

Figure 8A:
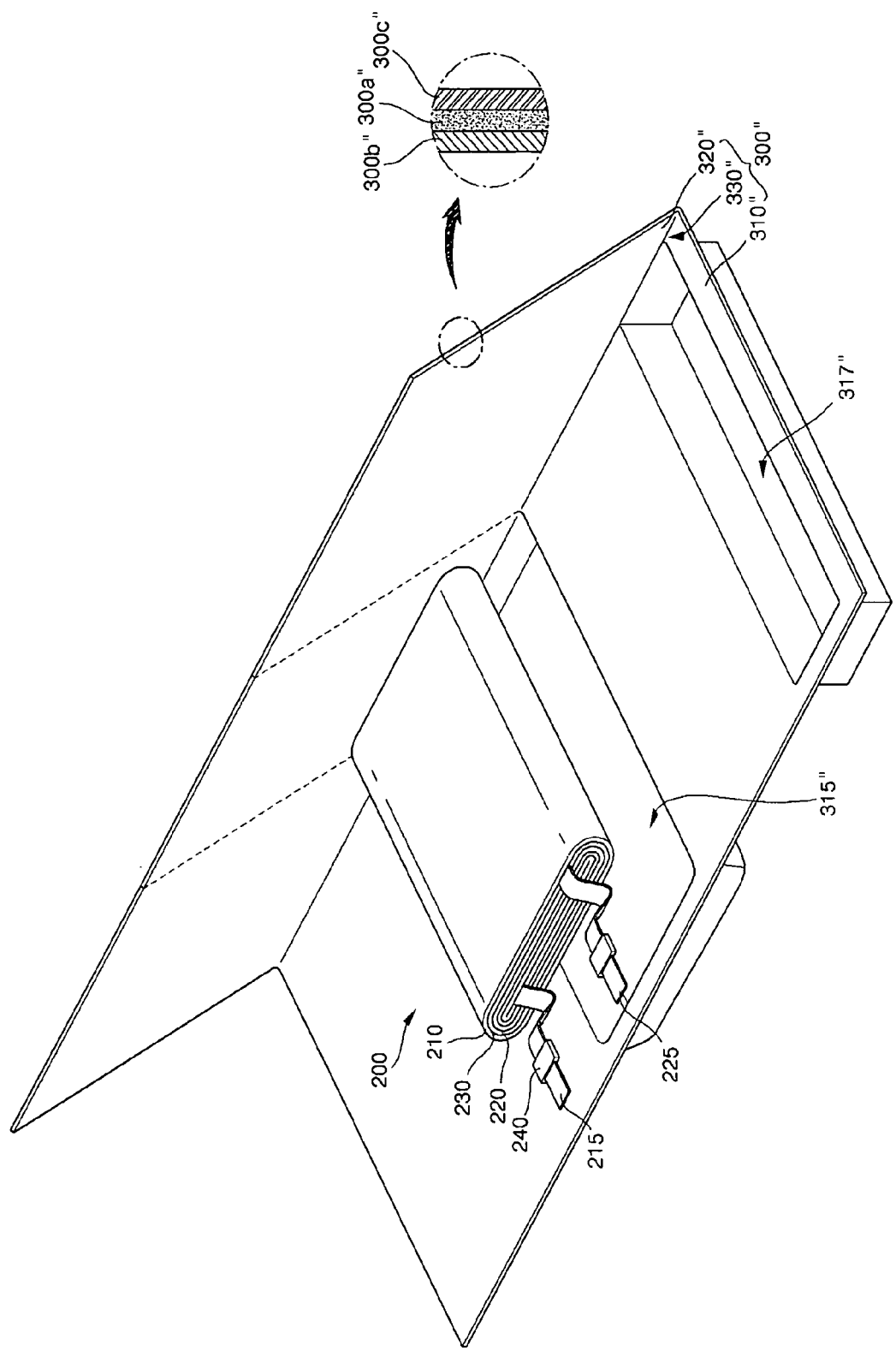
FIGS. 8A through 8E are schematic views of a pouch type lithium secondary battery at stages of a fabricating process according to another embodiment of the present invention.

First, referring to FIG. 8A, in the process of preparing a pouch exterior having first and second hollows (S11), the pouch exterior 300" is folded along a folding line 330" so that front and rear plates 320" and 310" are discriminated. The rear plate 310" includes first and second hollows 315" and 317".

The first hollow 315" and the second hollow 317" may be provided near one or both ends of the left and right wing portions.

The layer structure of the pouch exterior 300" includes: a core layer 300a" made of a metallic material such as aluminum; a thermoplastic resin layer 300b" formed on the core layer 300a"; and an insulation layer 300c" formed beneath the core layer 300a". The thermoplastic resin layer 300b" may be made of, for example, CPP (Casted Polypropylene), and function as a bonding layer. The insulation layer 300c" may be made of nylon or PET (Polyethylene Terephthalate). However, the layer structure and the material of the pouch exterior 300" are not limited the aforementioned materials.

In the process of storing the electrode assembly in the first hollow (S12), as shown in FIG. 8A, the electrode assembly 200 is stored in the first hollow 315" of the rear plate 310" of the pouch exterior 300'. In this case, the first and second electrode taps 215 and 225 protrude outside of the pouch exterior 300" by a predetermined length.

The sequence of the processes of preparing the electrode assembly 200 and the pouch exterior 300" is not limited the aforementioned sequence. Instead, the electrode assembly 200 may be prepared first, and then, the pouch exterior 300" may be prepared.

Figure 8B:
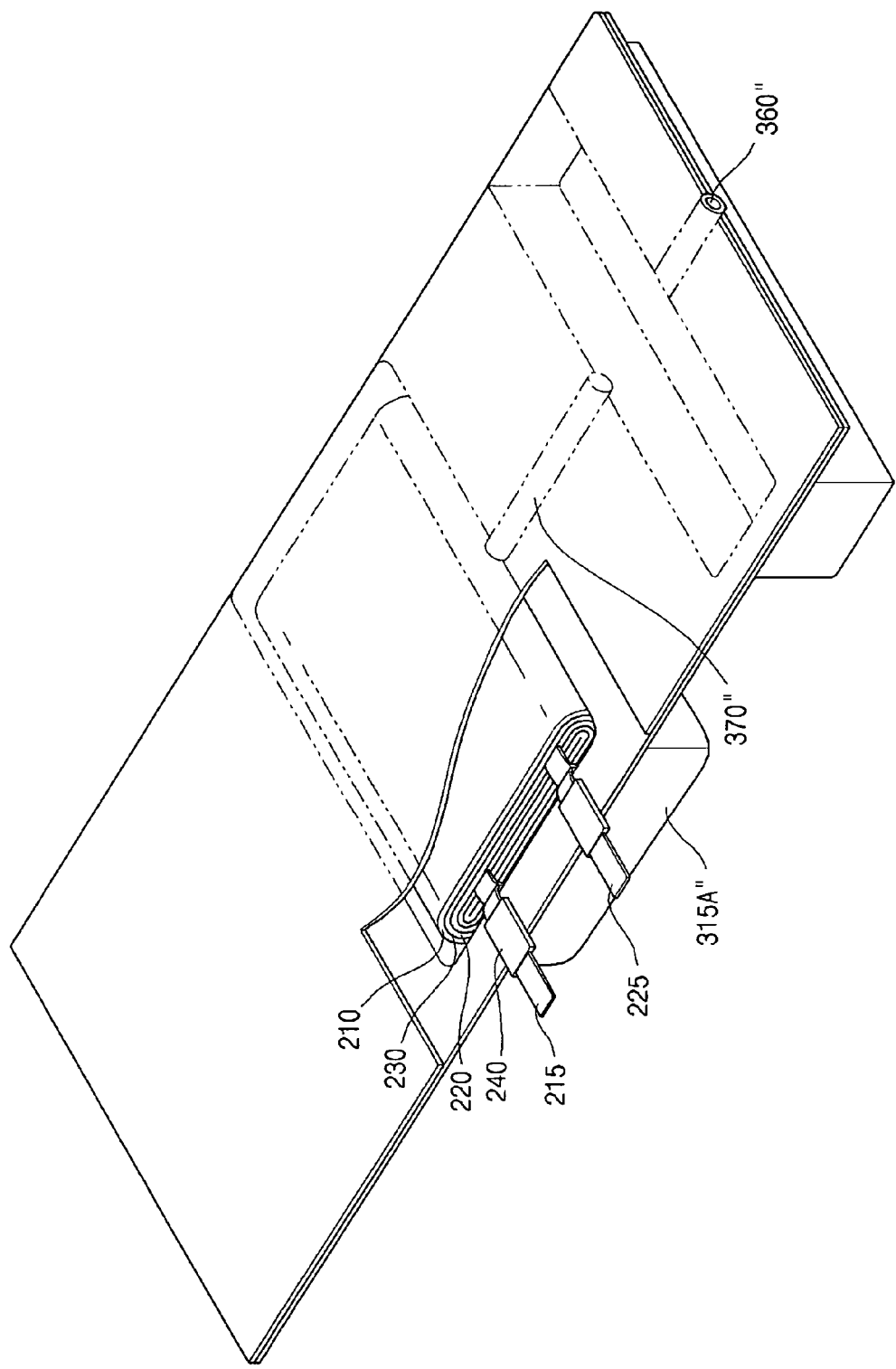
Figure 8C:
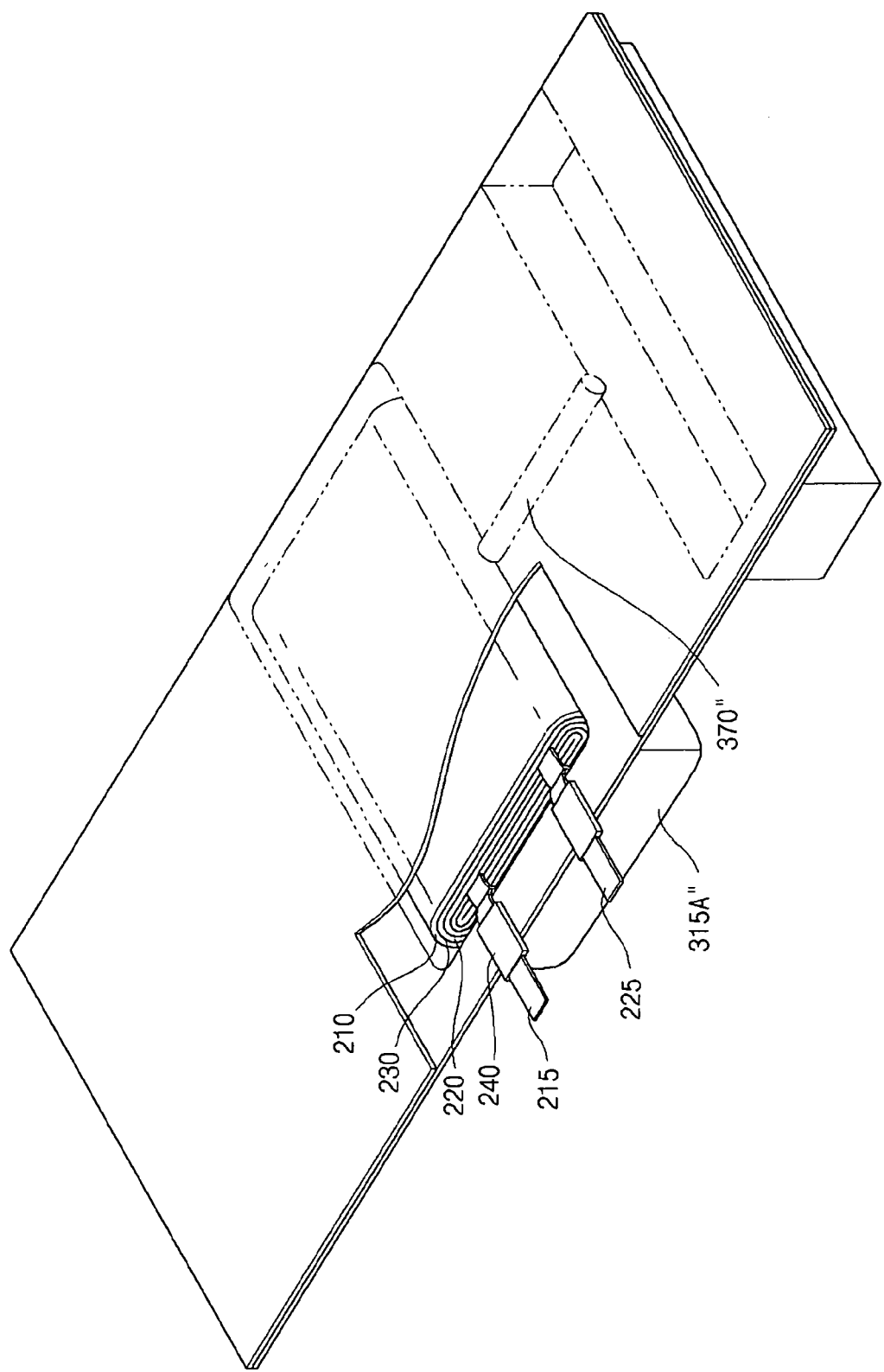

In the process of sealing the pouch exterior except for first and second paths (S13), as shown in FIG. 8B, the first and second paths 360" and 370" are formed, while the pouch exterior 300" is folded along the folding line 330" and the front and rear plates 320" and 310" are sealed.

More specifically, after the electrode assembly 200 is stored in the first hollow 315", the pouch exterior 300" is folded along the folding line 330" so that the front and rear plates 310" and 320" face each other. Then, the first path 360" connecting the second hollow 317" to the outside of the pouch exterior 300" and the second path 370" connecting the first hollow 315" to the second hollow 317" are formed, while the front and rear plates 320" and 310" are sealed. It should be noted that the first hollow 315" functions as an electrode assembly storing portion 315A".

In the process of injecting electrolyte to soak the electrode assembly (S14), the electrolyte is injected through the first path 360" while the pouch exterior 300" is erected such that the second hollow 317" becomes upside. Then, the pouch exterior 300" is exposed to a vacuum atmosphere to soak the electrode assembly 200 in the electrolyte.

In the process of sealing the first path, after the electrolyte (S15) is injected to soak the electrode assembly 200, the first path 360" is sealed.

In the process of performing initial charge/discharge and collecting gases in the second hollow (S16), the initial charge/discharge is performed while the pouch exterior 300" is erected such that the second hollow 317" becomes upside. In this case, gases are generated in the electrode assembly 200 during the initial charge/discharge. The generated gases are collected in the second hollow 340" via the second path 370".

Figure 8D:
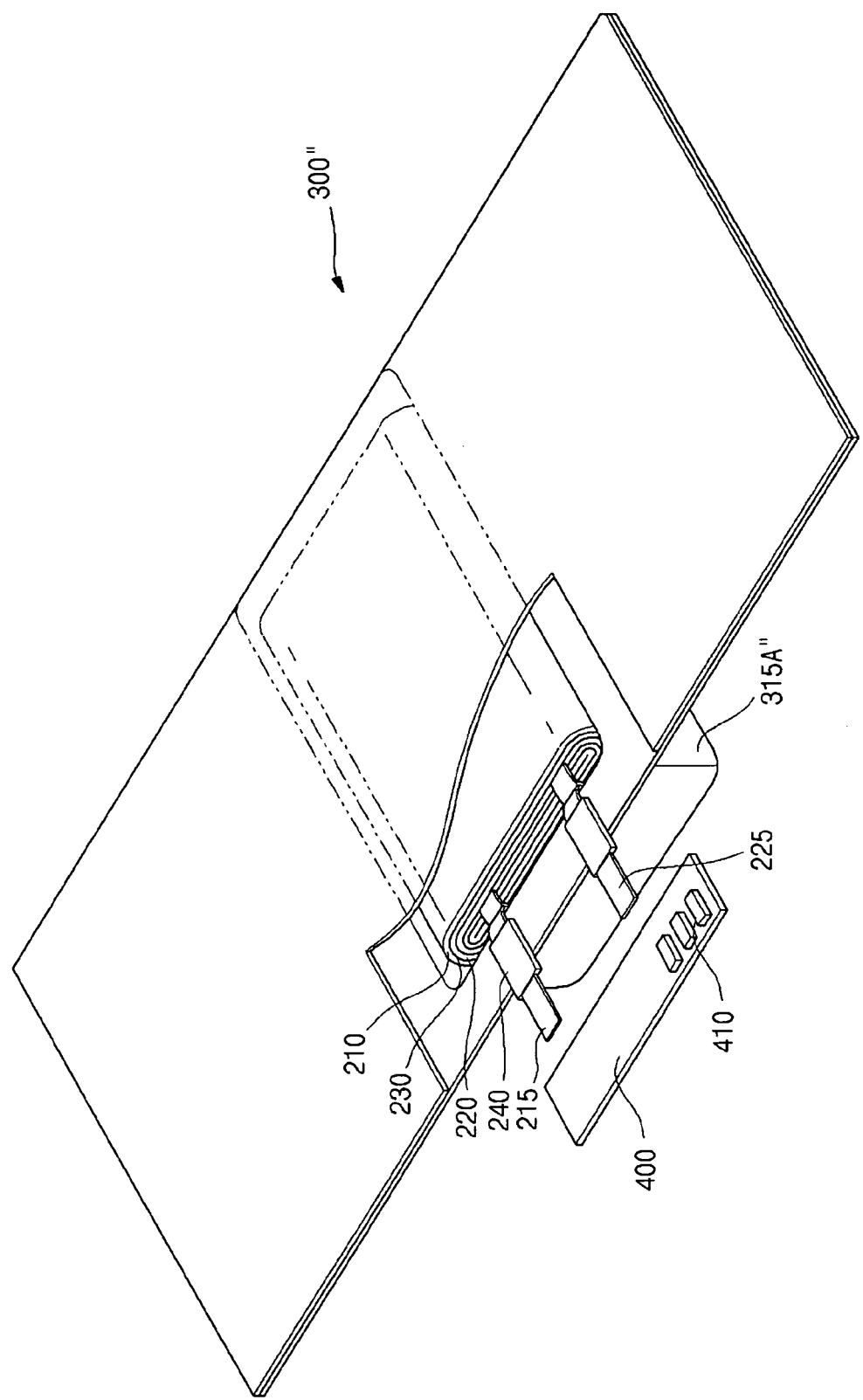
Figure 8E:
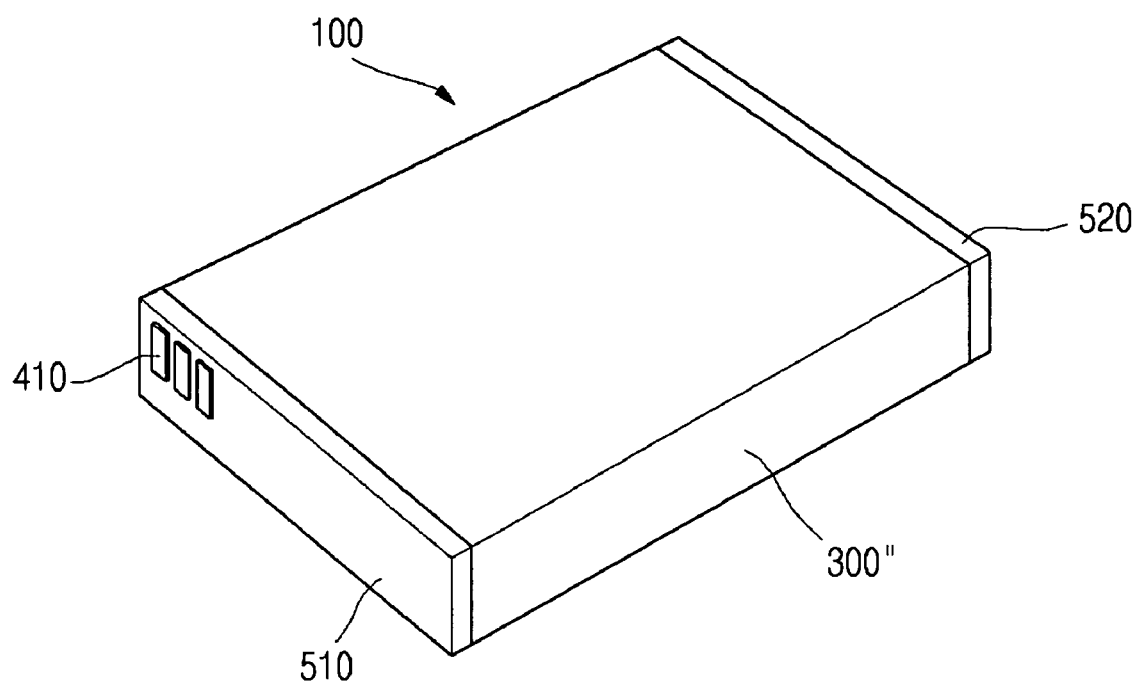

In the process of sealing the second path and removing the second hollow (S17), as shown in FIG. 8D, after gases are collected in the second hollow 317" by the initial charge/discharge, the second path 370" connecting the first hollow 315" to the second hollow 317" is sealed. Then, the second hollow 317" is cut out from the pouch exterior 300", so that the gases collected during the initial charge/discharge are removed.

In the process of installing the protection circuit module (S18), after the second hollow 317" is cut out, the protection circuit module 400 is electrically connected to the first and second electrode taps 215 and 225 of the electrode assembly 200. It should be noted that the protection circuit module 400 includes various protection circuits and the input/output terminal 410 for charging/discharging the electrode assembly 200 to control the charge/discharge of the electrode assembly 200 and error operations.

In the process of wrapping the pouch exterior (S19), after the protection circuit module 400 is installed, the electrode assembly storing space is wound around by the pouch exterior to enclose its periphery.

The sequence of the process of installing the protection circuit module (S18) and the process of wrapping the pouch exterior (S19) is not limited to the aforementioned sequence. Instead, the process of the wrapping the pouch exterior (S19) may be performed before the process of installing the protection circuit module (S18).

In the process of hot-melting the first and second portions (S20), after the electrode assembly storing space is wound around by the pouch exterior 300, the first portion to which the protection circuit module 400 of the pouch bare cell is connected and the second portion of the pouch bare cell are molded by a hot-melting method to form the first and second molding units 510 and 520, thereby finally providing the pouch type lithium secondary battery 100.

The input/output terminal 410 of the protection circuit module 400 can be exposed to the outside of the pouch exterior 300" when the first molding unit 510 is formed.

According to this embodiment of the present invention, the electrode assembly storing portion 315A" is wound around by part of the pouch exterior 300" to package the pouch type lithium secondary battery without using a separate package case. Therefore, it is possible to simplify the packaging process.

In addition, it is possible to reduce manufacturing cost of the pouch type lithium secondary battery.

While the present invention has been particularly shown and described with reference to exemplary embodiments thereof, it will be understood by those skilled in the art that various changes in form and details may be made therein without departing from the spirit and scope of the invention as defined by the appended claims and their equivalents.

What is claimed is:

1. A pouch type lithium secondary battery comprising:
    an electrode assembly comprising a first electrode plate connected to a first electrode tap, a second electrode plate connected to a second electrode tap, and a separator between the first electrode plate and the second electrode plate; and
    a pouch housing the electrode assembly in an electrode assembly storing portion, the electrode assembly storing portion having a bottom surface, a pair of side faces and a wing portion comprising a front plate and a rear plate extending from at least an end of the electrode assembly storing portion, wherein both the front plate and the rear plate of the wing portion wind entirely around the bottom surface and the pair of side faces of the electrode assembly storing portion.

2. The pouch type lithium secondary battery according to claim 1, further comprising a protection circuit module, wherein the protection circuit module is electrically connected to the electrode assembly and has an input/output terminal for charging/discharging the electrode assembly.

3. The pouch type lithium secondary battery according to claim 2, further comprising a first molding unit on the pouch, the first molding unit covering a surface of the protection circuit module except for the input/output terminal.

4. The pouch type lithium secondary battery according to claim 3, further comprising a second molding unit on the pouch.

5. The pouch type lithium secondary battery according to claim 3, wherein the first molding unit is a hot-melted molding unit.

6. The pouch type lithium secondary battery according to claim 5, wherein the first molding unit comprises a thermoplastic adhesive.

7. The pouch type lithium secondary battery according to claim 6, wherein the thermoplastic adhesive is selected from the group consisting of an ethylene-vinyl acetate (EVA) copolymer based material, a polyamide based material, a polyester based material, a rubber based material, and a polyurethane based material.

8. The pouch type lithium secondary battery according to claim 1, further comprising a first insulation plate and a second insulation plate on the electrode assembly.

9. The pouch type lithium secondary battery according to claim 1, wherein the pouch comprises: a core layer; a thermoplastic resin layer adjacent the core layer; and an insulation layer adjacent the core layer.

10. The pouch type lithium secondary battery according to claim 9, wherein:
- the core layer comprises aluminum;
- the thermoplastic resin layer comprises casted polypropylene; and
- the insulation layer comprises nylon or polyethylene terephthalate (PET).

11. The pouch type lithium secondary battery according to claim 1, wherein:
- the first electrode tap and the second electrode tap protrude from the electrode assembly storing portion on a first side; and
- the rear plate of the pouch extends from a second side of the electrode assembly storing portion.

12. A method of fabricating a pouch type lithium secondary battery, comprising:
- preparing a pouch including a front plate and a rear plate foldable along a folding line, the rear plate having an electrode assembly storing space comprising a bottom surface and a pair of side faces;
- storing an electrode assembly in the electrode assembly storing space such that the electrode assembly extends substantially parallel to the pair of side faces, the electrode assembly comprising a first electrode plate connected to a first electrode tap, a second electrode plate connected to a second electrode tap, and a separator between the first electrode plate and the second electrode plate;
- forming a pouch bare cell by sealing edges of the front plate and the rear plate of the pouch; and
- wrapping the electrode assembly with the front plate and the rear plate such that both the front plate and the rear plate wind entirely around the bottom surface and the pair of side faces of the electrode assembly storing space.

13. The method according to claim 12, wherein the electrode assembly storing space is proximate an edge of the rear plate of the pouch.

14. The method according to claim 12, further comprising installing a protection circuit module on the pouch, the protection circuit module including an input/output terminal, and electrically connecting the protection circuit module to the first electrode tap and to the second electrode tap.

15. The method according to claim 14, further comprising covering the protection circuit module on the pouch with a first molding unit by hot-melting the pouch while the input/output terminal is exposed from the pouch.

16. The method according to claim 12, further comprising forming a first molding unit on the pouch by hot-melting the pouch.

17. The method according to claim 12, wherein the forming of the pouch bare cell further comprises:
- partially sealing a part of the pouch to provide a gas collecting space, a first path connecting the electrode assembly storing space to the gas collecting space, and a first through-hole connecting the gas collecting space to an exterior of the pouch;
- injecting electrolyte through the first through-hole to soak the electrode assembly after partially sealing a part of the pouch to provide a gas collecting space;
- sealing the first through-hole;
- performing initial charge/discharge of the pouch bare cell to collect gases in the gas collecting space; and
- removing the gases in the first through-hole and the gas collecting space and sealing the first through-hole and the gas collecting space by hot-melting.

18. The method according to claim 17, wherein the first through-hole connects the gas storing space to the exterior of the pouch at a periphery of the gas storing space opposite to the electrode assembly storing space, and
- the second through-hole is between the electrode assembly storing space and the gas storing space.

* * * * *